(12) United States Patent
Ogawa

(10) Patent No.: US 7,933,433 B2
(45) Date of Patent: Apr. 26, 2011

(54) LANE MARKER RECOGNITION APPARATUS

(75) Inventor: Takashi Ogawa, Kariya (JP)

(73) Assignee: Denso Corporation, Kariya (JP)

( * ) Notice: Subject to any disclaimer, the term of this patent is extended or adjusted under 35 U.S.C. 154(b) by 976 days.

(21) Appl. No.: 11/804,939

(22) Filed: May 21, 2007

(65) Prior Publication Data
US 2007/0276599 A1 Nov. 29, 2007

(30) Foreign Application Priority Data
May 23, 2006 (JP) ................................. 2006-143204

(51) Int. Cl.
G06K 9/00 (2006.01)
(52) U.S. Cl. ........................................................ 382/104
(58) Field of Classification Search .................. 382/103, 382/104; 701/41; 340/435
See application file for complete search history.

(56) References Cited

U.S. PATENT DOCUMENTS

| 5,339,367 | A | * | 8/1994 | Roth ............................. 382/199 |
| 6,317,202 | B1 | | 11/2001 | Hosokawa et al. |
| 6,850,628 | B2 | | 2/2005 | Shirato |
| 6,879,706 | B2 | | 4/2005 | Satoh et al. |
| 7,216,023 | B2 | * | 5/2007 | Akita ............................. 701/41 |
| 2003/0103649 | A1 | | 6/2003 | Shimakage |
| 2005/0265579 | A1 | * | 12/2005 | Nishida .......................... 382/103 |
| 2007/0069874 | A1 | * | 3/2007 | Huang et al. ................... 340/435 |

FOREIGN PATENT DOCUMENTS

| JP | 09-198512 | 7/1997 |
| JP | 11-259639 | 9/1999 |
| JP | 2000-147124 | 5/2000 |
| JP | 2003-036500 | 2/2003 |
| JP | 2004-205527 | 7/2004 |
| JP | 2005-222538 | 8/2005 |

OTHER PUBLICATIONS

Office action dated Nov. 13, 2008 in corresponding German Application No. 10 2007 020 791.5-53.
Office Action mailed on Nov. 9, 2010 from JPO in the corresponding Japanese Patent Application No. 2006-143204 with English translation.

* cited by examiner

Primary Examiner — Vu Le
Assistant Examiner — Claire Wang
(74) Attorney, Agent, or Firm — Harness, Dickey & Pierce, PLC

(57) ABSTRACT

Data on a lane marker are extracted based on a centerline position, centerline shape, and width of a lane, which are projected for the present cycle. Data on a lane centerline are generated by adjusting x-axis components of the extracted data. A centerline position and centerline shape is calculated with the Hough's transformation using the generated data on the lane centerline. A frequency distribution is calculated for opposing positions with respect to the lane centerline. A lane width of the road is calculated by calculating an auto-correlation function with respect to the frequency distribution. A centerline position, centerline shape, and lane width at the present cycle and subsequent cycles are estimated/projected with the Kalman filter.

11 Claims, 7 Drawing Sheets

LANE MARKER RECOGNITION APPARATUS

CROSS REFERENCE TO RELATED APPLICATION

This application is based on and incorporates herein by reference Japanese Patent Application No. 2006-143204 filed on May 23, 2006.

FIELD OF THE INVENTION

The present invention relates to a vehicular lane marker recognition apparatus for recognizing a lane marker on a road.

BACKGROUND OF THE INVENTION

Patent document 1 discloses a calculation to specify a lane marker based on data on reflection from a road surface using a lidar (i.e., laser radar) instrument mounted in a vehicle. Here, data on a plane parallel with a road surface are subjected to a frequency distribution in a vehicle's axle directional component. Data included in a certain segment where the frequency reaches the local maximum value is extracted as data on reflection from a lane marker. The extracted data is then subjected to a method of least square or Hough's transformation to thereby compute a parameter to specify the lane marker.

Patent document 1: JP-A-2005-222538

Patent document 1 assumes that a lane marker has an approximately linear shape. When a road curves with a large amount of curvature, data on reflection from a lane marker cannot be accurately extracted, resulting in mis-recognition of a lane marker.

SUMMARY OF THE INVENTION

It is an object of the present invention to provide a vehicular lane marker recognition apparatus for robustly recognizing a lane marker without limitation to a specific road condition.

According to an aspect of the present invention, a lane marker recognition apparatus for recognizing a lane marker on a road frontward or rearward of a vehicle in repeated cycles is provided as follows. A characteristic object detection unit is configured to detect a characteristic object on a road. A lane marker extraction unit is configured to extract data on a lane marker from data on the detected characteristic object. A centerline calculation unit is configured to calculate a centerline position and a centerline shape on the road from the extracted data. A width calculation unit is configured to calculate a lane width of the road from the extracted data. A parameter follow-up unit is configured to perform a follow-up process of parameters defining the centerline position, the centerline shape, and the lane width based on the calculated centerline positions, calculated centerline shape, and calculated lane width. When the lane marker extraction unit extracts the data on the lane marker at a present cycle, the lane marker extraction unit uses a result from the follow-up process performed at a past cycle by the parameter follow-up unit.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
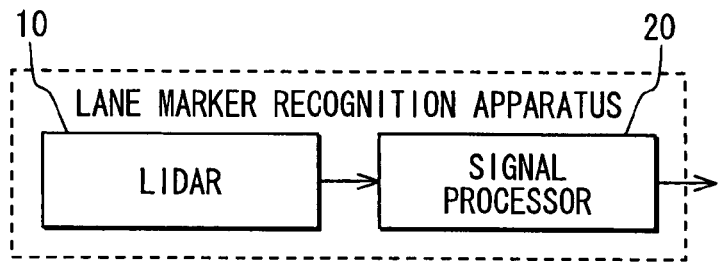
FIG. 1 is a block diagram illustrating a configuration of a lane marker recognition apparatus according to an embodiment of the present invention.

A vehicular lane marker recognition apparatus according to an embodiment of the present invention will be explained below. The apparatus performs recognitions for lane markers on roads periodically (i.e., with repeated cycles from a past cycle (including a previous cycle) to a present cycle, further to a future cycle (including a next cycle). The apparatus is provided in a subject vehicle and includes a lidar instrument 10 (i.e., a laser radar instrument) and a signal processor 20, as shown in FIG. 1.

The lidar instrument 10 is a known in-vehicle laser radar sensor. It scans (i.e., radiates laser beams to) surfaces of a road ahead of (i.e., frontward of) the subject vehicle in a range having a predetermined angle, and receives the reflection. Here, the lidar instrument 10 may scan surfaces rearward of the subject vehicle. The lidar instrument 10 measures a distance to a reflection object (i.e., an on-road characteristic object) on the surface of the road within the radiation orientations of the laser beams based on a time period from when a beam is radiated to when the reflection is received.

The lidar instrument 10 computes a position of the on-road characteristic object in an x-y orthogonal coordinates originated from the center of the lidar instrument 10, and outputs the computed measurement value P to the signal processor 20. Here, the x-axis is a vehicle heading direction, while the y-axis is parallel with an axle of the subject vehicle 1. Thus, an on-road characteristic object such as a lane marker or the like can be detected from measurement results by the lidar instrument 10.

Figure 2A:
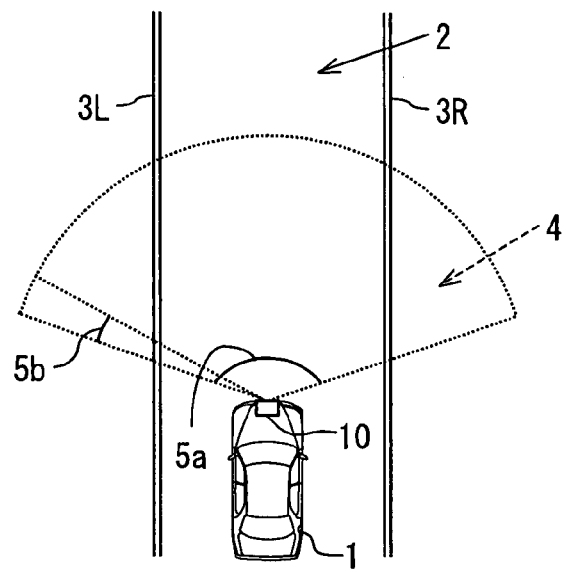
FIG. 2A is a view illustrating a horizontal detection range covered by the lidar instrument in FIG. 1.
Figure 2B:
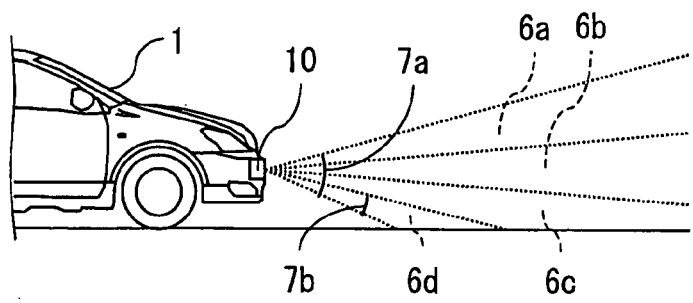
FIG. 2B is a view illustrating a vertical detection range covered by the lidar instrument in FIG. 1.

The lidar instrument 10 is installed in the front end of the subject vehicle 1. The detection range of the lidar instrument 10 is shown in FIGS. 2A, 2B. FIG. 2A shows a positional relationship of a horizontal detection range 4 of the instrument 10, a lane 2 of a road, a painted left lane marker 3L, and a painted right lane marker 3R. Each laser beam is radiated with a horizontal radiation angle 5b; all the beams are radiated within a horizontal entire radiation angle 5a. Thus, the horizontal detection range 4 can cover part of the left lane marker 3L and right lane marker 3R.

FIG. 2B shows vertical detection ranges 6a to 6d. Each beam is radiated with a vertical radiation angle 7b; all the beams are radiated within a vertical entire radiation angle 7a.

Thus, with respect to each of the vertical detection ranges 6a, 6b, 6c, 6d, the lidar instrument 10 radiates beams with multiple horizontal radiation angles 5b totaling to the horizontal entire radiation angle 5a. The lidar instrument 10 receives reflections relative to each radiation beam to output the measurement values P to the signal processor 20.

Figure 3:
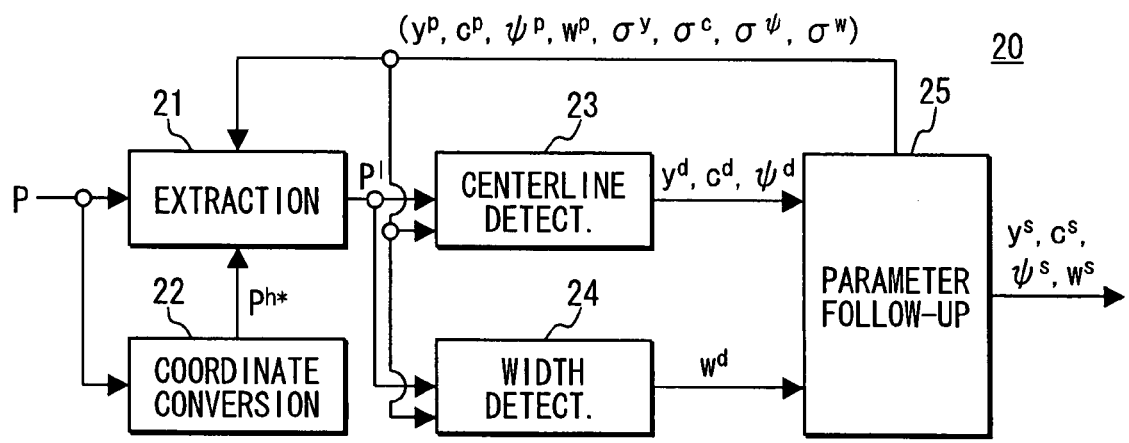
FIG. 3 is a block diagram illustrating a configuration of the signal processor in FIG. 1.

FIG. 3 shows a functional configuration of the signal processor 20. The processor 20 includes an extraction unit 21, a coordinate conversion unit 22, a lane-centerline detection unit 23, a lane-width detection unit 24, and a parameter follow-up unit 25.

Figure 4:
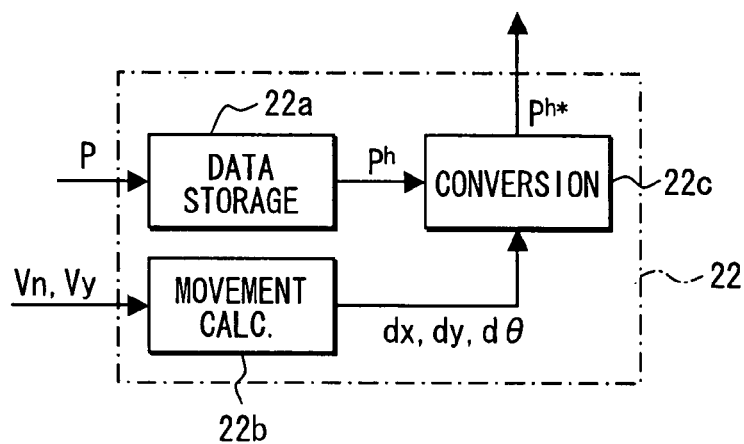
FIG. 4 is a block diagram illustrating a configuration of the coordinate conversion unit in FIG. 3.

With reference to FIG. 4, the coordinate conversion unit 22 includes a data storage unit 22a, a movement calculation unit 22b, and a conversion unit 22c. The data storage unit 22a stores measurement values P outputted from the lidar instrument 10 every cycle.

The movement calculation unit 22b calculates a movement amount (dx, dy, dθ) of the subject vehicle 1, e.g., using travel information (a vehicle speed Vn, yaw rate Vy) obtained via an in-vehicle LAN (not shown). Here, "dx" indicates a movement amount in an axle direction for a predetermined interval (e.g., one cycle); "dy" indicates a movement amount in a heading direction for the predetermined interval; and "dθ" indicates a rotational angle (a yaw angle) around the vertical axis of the subject vehicle 1 for the predetermined interval.

The conversion unit 22c converts measurement value $P^h$ in a past cycle (e.g., previous cycle) stored in the data storage unit 22a into a measurement value $P^{h*}$ (called coordinate-converted measurement value $P^{h*}$) on the x-y standard coordinate system based on a position of the subject vehicle 1 at the present cycle by using the computed movement amount (dx, dy, dθ) with the known Helmert's transformation. In other words, the measurement value $P^h$ in the past cycle is based on past standard coordinates meeting a position of the vehicle 1 at the past cycle; the coordinate-converted measurement value $P^{h*}$ is based on present standard coordinates meeting a position of the vehicle 1 at the present cycle.

The conversion unit 22c outputs the coordinate-converted measurement value $P^{h*}$ to the extraction unit 21.

The extraction unit 21 obtains the measurement value P of the present cycle outputted from the lidar instrument 10 and the coordinate-converted measurement value $P^{h*}$ of the past cycle outputted from the conversion unit 22c and then extracts data on a lane marker of a road which extends ahead of the subject vehicle 1.

Thus, the data on a lane marker are extracted from a combination of the measurement values of the present cycle and the past cycle. With respect to a lane marker painted as a not-continued line such as a dotted line or a broken line, the position of the lane marker as a characteristic object measured by the lidar instrument 10 does not appear continuously in a heading direction of the subject vehicle 1. According to the above configuration, possibility of losing sight of such a lane marker painted as a not-continued line may be decreased.

The extraction unit 21 calculates a projected position and projected range of the lane marker relative to the present cycle based on a projected result, which is projected by the parameter follow-up unit 25 at the previous cycle for use in the present cycle. The project result includes (i) a projected value of a centerline position $y^P$, centerline shape (curvature $c^P$, inclination (i.e., angle) $\psi^P$), and width $w^P$ of a lane, and (ii) its covariance. Further, a standard deviation ($\sigma^y$, $\sigma^c$, $\sigma^\psi$, $\sigma^w$) for the projected value ($y^P$, $c^P$, $\psi^P$, $w^P$) is calculated from the covariance.

Figure 6:
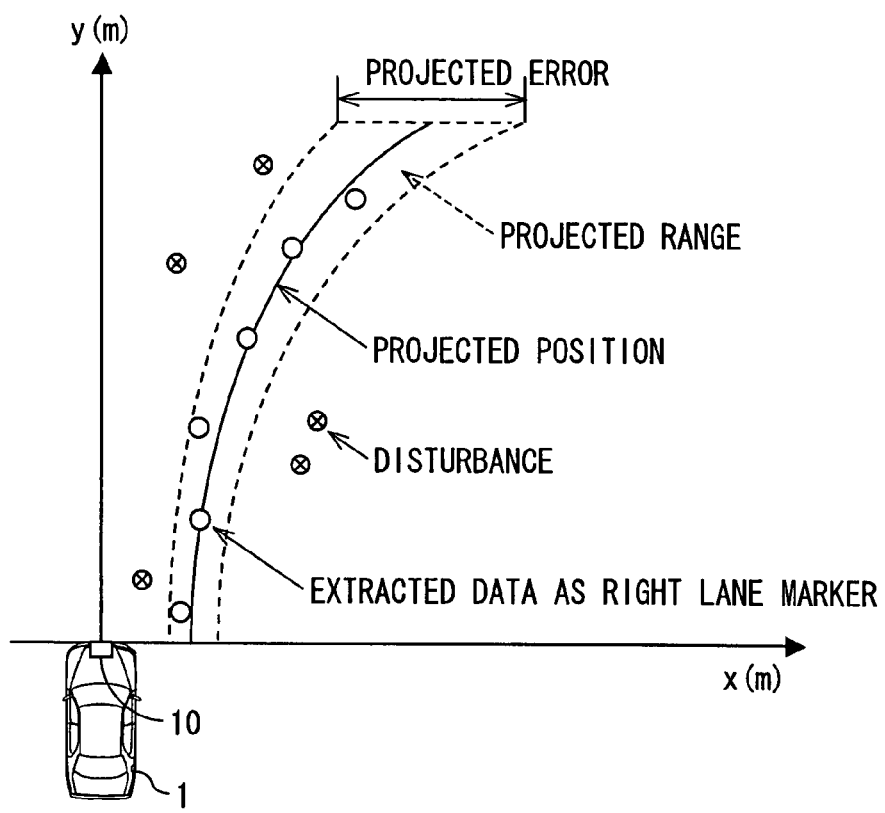
FIG. 6 is a diagram illustrating projected positions and a projected range of a right lane marker.

In the x-y standard coordinate system in FIG. 6, the projected position and range of a lane marker (i.e., a right lane marker) in the right side of the subject vehicle 1 are indicated by the following formula:

$$x \geq \{c^P_R - (3\cdot\sigma^c_R)\}\cdot y^2 + \{\phi^P_R - (3\cdot\sigma^\phi_R)\}\cdot y + \{y^P_R - (3\cdot\sigma^y_R)\} + \{(-w^P/2) - (3\cdot\sigma^w)\}$$

$$x \leq \{c^P_R + (3\cdot\sigma^c_R)\}\cdot y^2 + \{\phi^P_R + (3\cdot\sigma^\phi_R)\}\cdot y + \{y^P_R + (3\cdot\sigma^y_R)\} + \{(w^P/2) + (3\cdot\sigma^w)\} \quad \text{(Formula 1)}$$

Here, suffix R means "Right." In contrast, in the x-y standard coordinate system in FIG. 6, the projected position and range of a lane marker in the left side of the subject vehicle 1 are indicated by the following formula:

$$x \geq \{c^P_L - (3\cdot\sigma^c_L)\}\cdot y^2 + \{\phi^P_L - (3\cdot\sigma^\phi_L)\}\cdot y + \{y^P_L - (3\cdot\sigma^y_L)\} + \{(-w^P/2) - (3\cdot\sigma^w)\}$$

$$x \leq \{c^P_L + (3\cdot\sigma^c_L)\}\cdot y^2 + \{\phi^P_L + (3\cdot\sigma^\phi_L)\}\cdot y + \{y^P_L + (3\cdot\sigma^y_L)\} + \{(w^P/2) + (3\cdot\sigma^w)\} \quad \text{(Formula 2)}$$

Here, suffix L means "Left." Formula 1 and Formula 2 correspond to a model for a lane centerline indicated by Formula 3 used for the Hough's transformation (to be explained later). Further, when an inclination ψ is small enough to be negligible, Formula 3 may be simplified as Formula 4 (to be explained later). In this case, in Formula 1 and Formula 2, the linear expression in y (i.e., y linear terms) may be eliminated. Formula 3 and Formula 4 will be explained later.

The extraction unit 21 extracts measurement values P and coordinate-converted measurement values $P^{h*}$, which are included in the projected range of the lane marker computed based on Formula 1 and Formula 2, as data $P^1$ on (i.e., corresponding to) the lane marker. The extracted data $P^1$ (called lane marker data) is outputted to the lane-centerline detection unit 23 and lane-width detection unit 24.

Thus, only the lane marker data relative to the present cycle can be extracted from all the measurement value P and the coordinate-converted measurement value $P^{h*}$. Here, the signal processor 20 may extract data on a lane marker by using only the measurement value P of the present cycle outputted from the lidar instrument 10. In this case, the coordinate conversion unit 22 may be removed.

Figure 7:
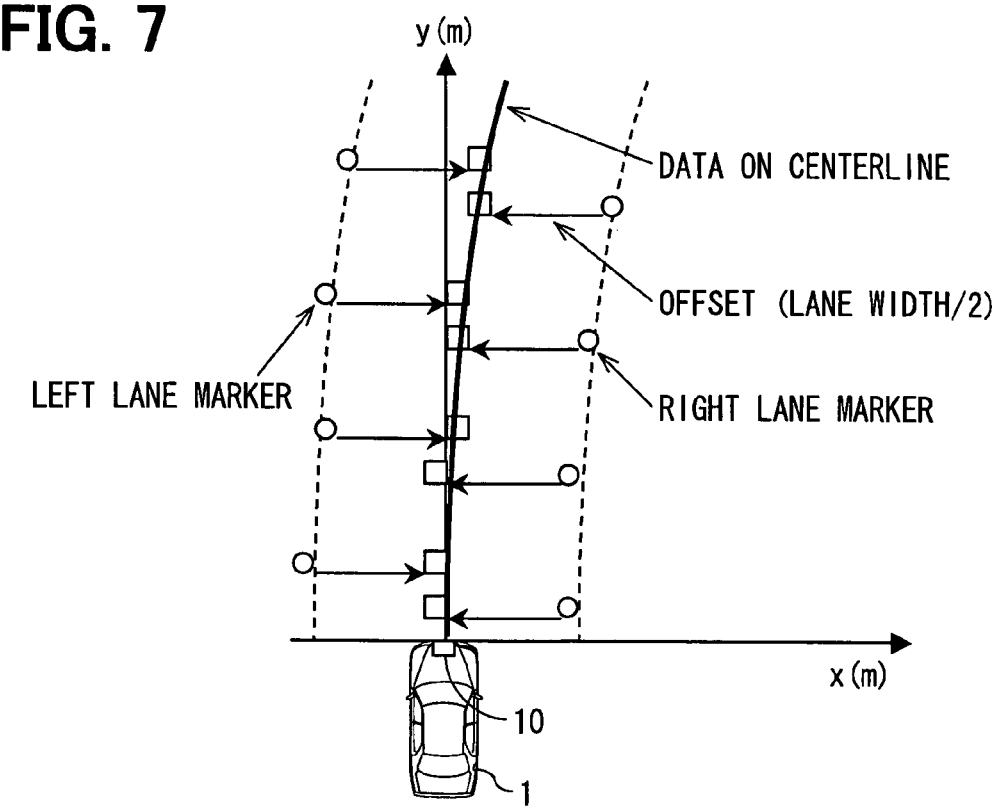
FIG. 7 is a diagram illustrating generation of a lane centerline.

The lane-centerline detection unit 23 functions as calculation means to generate data on a lane centerline based on an estimated lane width $w^s$ of the previous cycle or a projected lane width $w^P$ for use in the present cycle, both of which are calculated by the parameter follow-up unit 25. For instance, as shown in FIG. 7, axle directional components (x-axial components) of the lane marker data of a pair of the left lane marker and right lane marker are adjusted (i.e., offset) to generate data on the lane centerline.

An offset amount is a half (½) of the estimated lane width $w^S$ or projected lane width $w^P$.

The lane-width detection unit 24 functions as calculation means to then subject the generated data on a lane centerline to the Hough's transformation to thereby compute a position and shape of the lane centerline. The lane-centerline detection unit 23 makes a model for a lane centerline using a quadric curve indicated by Formula 3 or Formula 4 and calculates a parameter for specifying the quadric curve with the quadric curve subjected to the Hough's transformation. Based on the calculated parameter, an observed value of a centerline position yd and a centerline shape (a curvature $c^d$, an inclination $\psi^d$) is obtained. In the following formula, "x" and "y" are coordinate values (meter) in the x axis and y axis of the x-y standard coordinate system. Further, "$c_o$," "$\psi$," and "$y_{off}$" are a curvature (1/meter), an angle (rad), and a position (meter), respectively.

$$X = \{c_o \cdot y^2\} + \{\psi \cdot y\} + y_{off} \qquad \text{(Formula 3)}$$

$$x = \{c_o \cdot y^2\} + y_{off} \qquad \text{(Formula 4)}$$

Thus, the data on the lane centerline can be generated from the left and right lane marker data with the Hough transformation, so that the obtained position and shape of the lane centerline can be enhanced in their accuracies.

Figure 8:
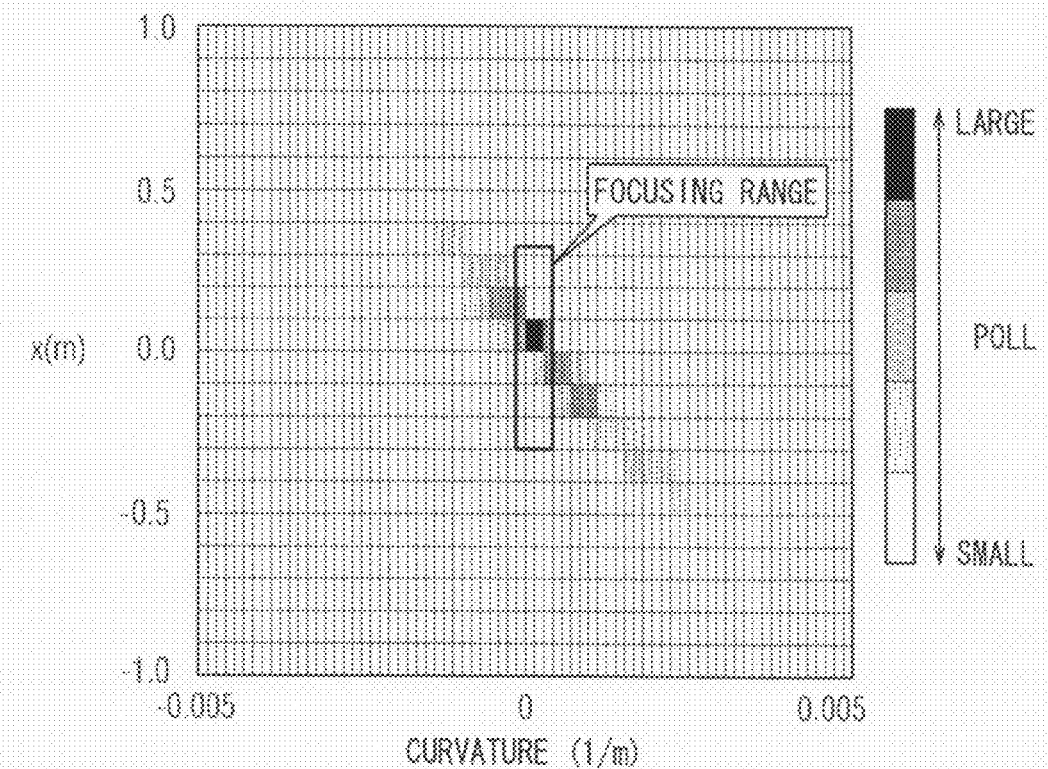
FIG. 8 is a diagram illustrating a parameter space and a focusing range.

In Hough's transformation, a focusing range is designated for a parameter space (see FIG. 8) constituted by parameters defining quadric curves using the above-mentioned projected value ($y^P$, $c^P$, $\psi^P$, $w_P$) and its covariance for the present cycle. Further, as explained above, the projected value for the present cycle is calculated at the previous cycle by the parameter follow-up unit 25. A parameter group having the maximum poll exceeding a predetermined number is calculated within the focusing range as parameters defining the quadric curve. This increases the robustness against disturbance (i.e., data on vehicles and roadside objects other than the lane marker, which are mistakenly extracted by the extraction unit 21). Further, counting the poll is limited to the focusing range of the parameter space. This decreases a time to calculate parameters defining the quadric curve.

The lane-centerline detection unit 23 calculates the observed value ($y^d$, $c^d$, $\psi^d$) of the centerline position, centerline curvature, and centerline inclination of the lane to thereafter output the observed value to the parameter follow-up unit 25.

Figure 9:
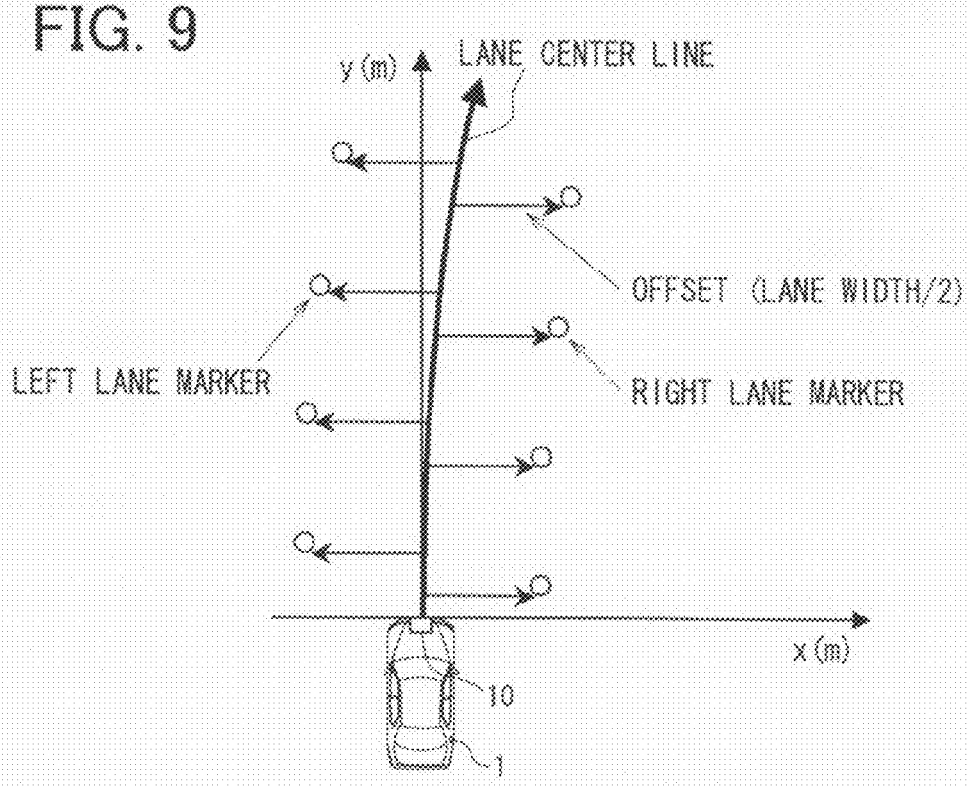
FIG. 9 is a diagram illustrating opposing positions in an axle direction with respect to a lane centerline.

The lane-width detection unit 24 calculates opposing positions (see FIG. 9) in the axle direction (x axis) relative to the centerline of a pair of the left and right lane marker data calculated by the extraction unit 21 by using the projected value ($y^P$, $c^P$, $\psi^P$) for the present cycle or the estimated value ($y^S$, $c^S$, $\psi^S$) at the previous cycle, with respect to the position, curvature, inclination of the centerline. As explained above, the projected value for the present cycle is calculated at the previous cycle by the parameter follow-up unit 25.

Figure 10:
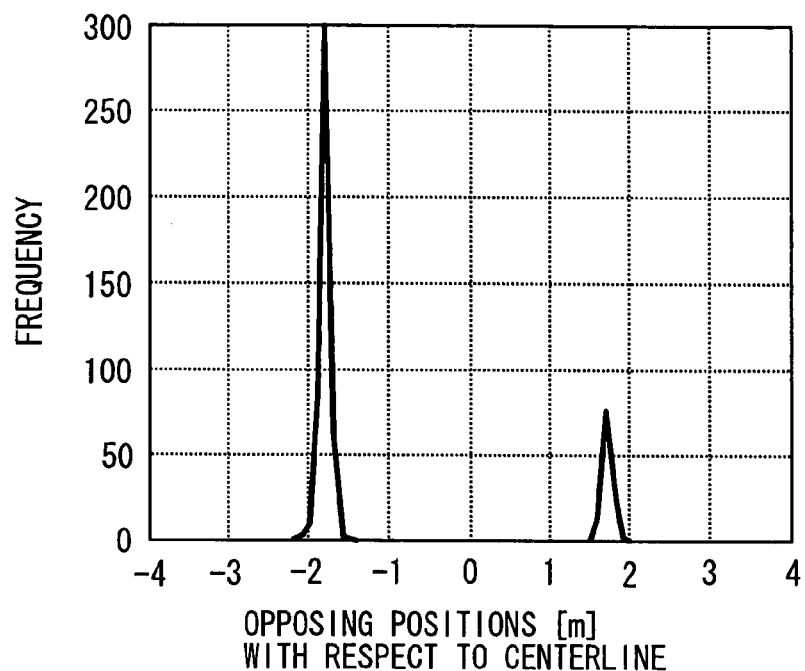
FIG. 10 is a diagram illustrating a frequency distribution of opposing positions with respect to a lane centerline.

Subsequently, the lane-width detection unit 24 divides the coordinate axis in the axle direction, as shown in FIG. 10, into multiple segments (i.e., called bins in statistics) and assigns the calculate opposing positions into the corresponding bins to thereby count the frequency in each bin.

Next, the lane-width detection unit 24 calculates an auto-correlation function having the opposing positions relative to the centerline as shift parameters to thereby calculate an observed value of a lane width ($w^d$) of the relevant road based on Formula 5. This allows accurate calculation of the lane width of the road. In Formula 5, x (n) indicates the frequency of the n-th opposing position; N indicates the total number of the bins for the opposing positions.

$$R \cdot x(k) = (1/N) \cdot \sum_{n=0}^{N-1-k} \{x(n) \cdot x(n+k)\} \qquad \text{(Formula 5)}$$

Figure 11:
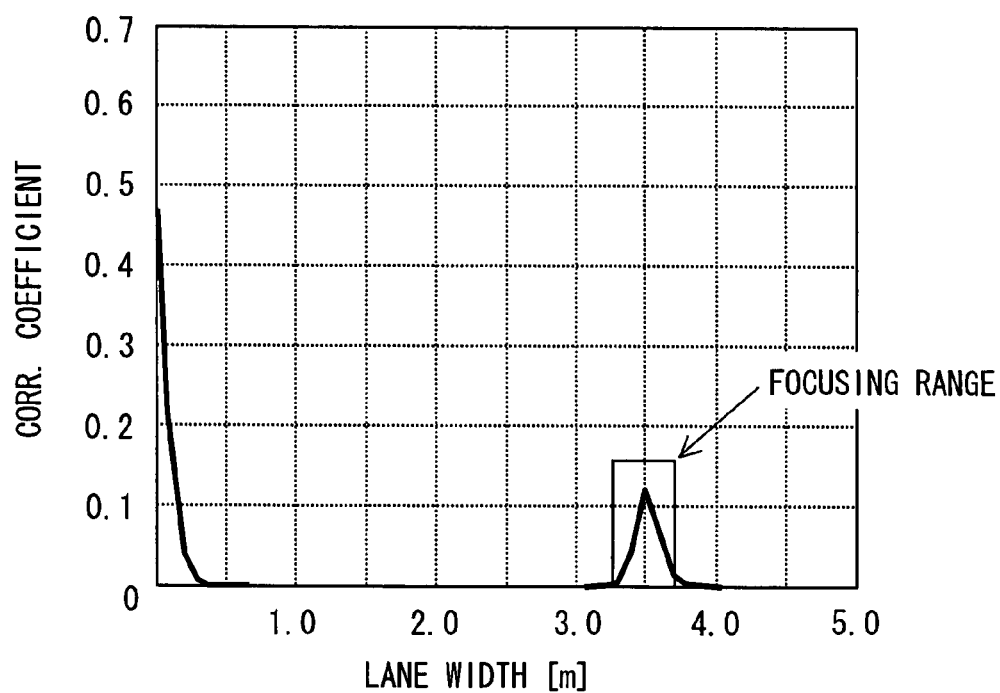
FIG. 11 is a diagram illustrating a focusing range designated for a shift parameter when an auto-correlation function is calculated.

The lane-width detection unit 24 designates a focusing range with respect to shift parameters, as shown in FIG. 11, by using the projected value ($w^P$) of the lane width and its covariance for the present cycle. A shift parameter having the maximum correlation coefficient exceeding a predetermined value is calculated within the focusing range as a lane width of the road. This increases robustness against disturbance; in other words, a peak of the auto-correlated value generated by the disturbance can be neglected. Further, determining the correlation coefficient is limited to those within the focusing range designated for the shift parameter. This decreases a time to calculate a lane width of the road.

The lane-width detection unit 24 calculates the observed value ($w^d$) of the lane width to thereafter output the observed value to the parameter follow-up unit 25.

The parameter follow-up unit 25 subjects the received observed value ($y^d$, $c^d$, $\psi^d$, $w^d$) to the known Kalman filter to thereby perform a follow-up process for following up a parameter defining the position, curvature, inclination of the lane centerline and the lane width.

In other words, the parameter follow-up unit 25 calculates an estimated value ($y^S$, $c^S$, $\psi^S$, $w^S$) of the centerline position, centerline curvature, and centerline inclination, and lane width by using the received observed value ($y^d$, $c^d$, $\psi^d$, $w^d$) with the Kalman filter to thereby output the estimated value as a recognition result of the lane marker at the present cycle to other in-vehicle devices or the in-vehicle LAN.

Further, the parameter follow-up unit 25 calculates a projected value ($y^P$, $c^P$, $\psi^P$, $w^P$) of the centerline position, centerline curvature, centerline inclination, and lane width and it covariance for the next cycle and outputs them to the extraction unit 21. The extraction unit 21 uses the received projected value and its covariance for the next cycle.

Figure 5:
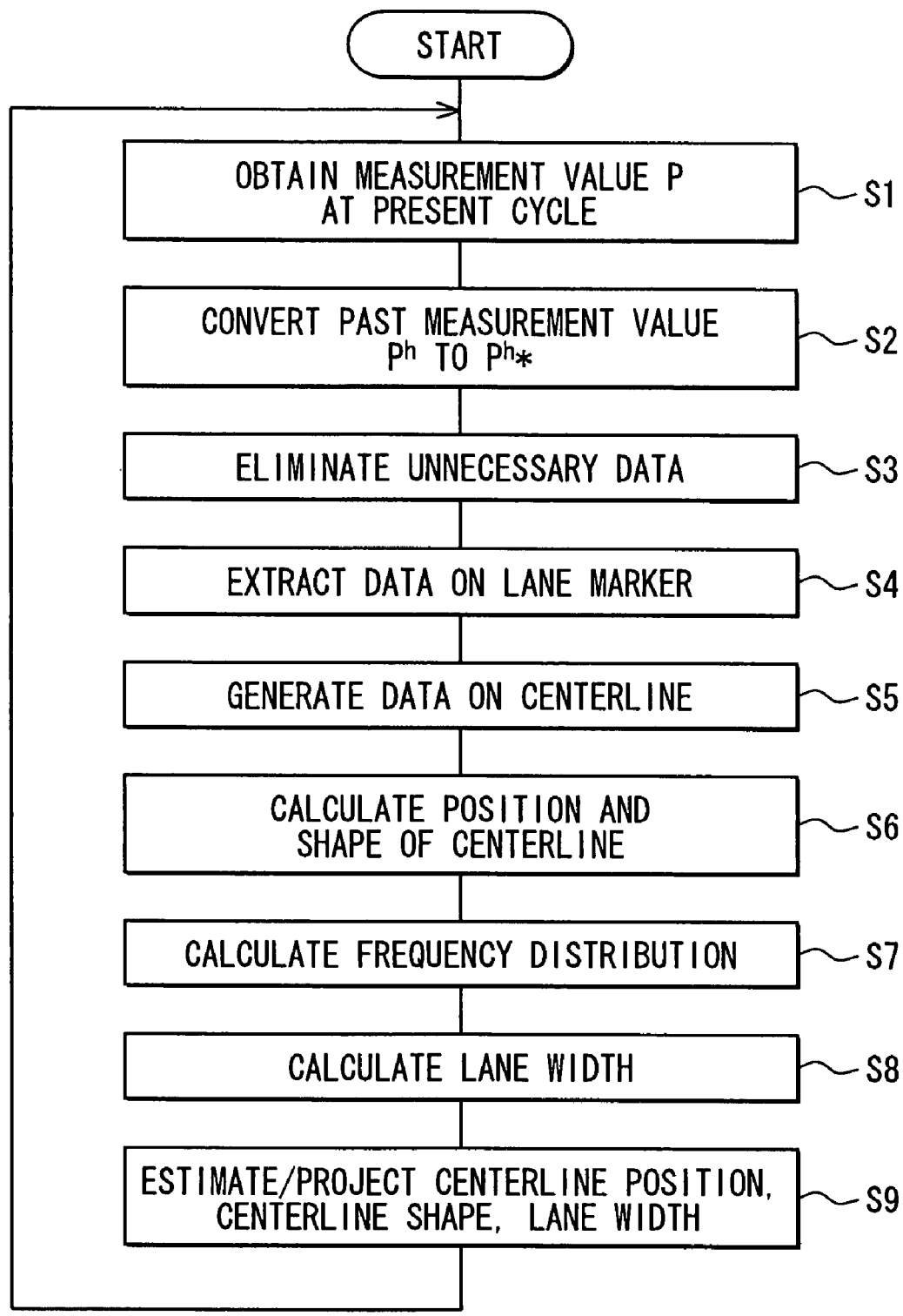
FIG. 5 is a flowchart diagram illustrating signal processing of the lane marker recognition apparatus in FIG. 1.

Next, signal processing of the vehicular lane marker recognition apparatus will be explained with reference to a flowchart in FIG. 5. The steps in the processing are repeatedly executed every cycle.

At Step S1, a measurement value P at a present cycle is obtained. The measurement value P is on the x-y orthogonal coordinate system. In this system, the origin is at the center of the lidar instrument 10 at the present cycle, the x axis is along the axle direction of the vehicle at the present cycle while the y axis is along the heading direction of the vehicle at the present cycle.

At Step S2, the measurement value $P^h$ at the past cycle is converted into data compliant with the standard coordinates based on the vehicle's position at the present cycle. Here, the past cycle may be the previous cycle alone, or the number of past cycles may be optionally selected based on vehicle movements or travel conditions. Coordinate-converted measurement values $P^{h*}$ is thus obtained after coordinate conversion. Step S2 may be omitted optionally.

At Step S3, a certain detection range not targeting at road surfaces (e.g., a vertical detection range 6a in FIG. 2B) is designated based on the setting conditions of the beam direction of the lidar instrument 10. A measurement value P measured in the certain detection range is eliminated. Further, when a certain condition is predetermined in respects (e.g., distance from the vehicle (y-axis coordinate value), a position in the axle (x-axis coordinate value), a reflection strength), a measurement value P not satisfying the certain condition is regarded as not corresponding to a lane marker and thereby eliminated.

At Step S4, a projected position and range of a lane marker at the present cycle are calculated using the projected value ($y^P$, $c^P$, $\psi^P$, $w^P$) of the centerline position, centerline curvature, centerline inclination, and lane width and its covariance, which is calculated at the previous cycle by the parameter follow-up unit 25. Then, the measurement values P or $P^h$ included in the lane marker projected range are extracted as data $P^l$ on (i.e., corresponding to) the lane marker. Further, each standard deviation ($\sigma^y$, $\sigma^c$, $\sigma^\psi$, $\sigma^w$) of the individual projected values are obtained from the corresponding covariance.

At Step S5, axle directional components (x-axis components) of a pair of left lane marker data and right lane marker data, which are extracted at Step S4, are adjusted (i.e., offset) by a half of the estimated lane width ($w^S$) or a half of the projected lane width ($w^P$) to thereby generate data on the lane centerline. At Step S6, the generated data on the lane centerline are subjected to the Hough's transformation to calculate a centerline position and centerline shape of the lane.

At Step S7, opposing positions of a pair of the left and right lane markers, with respect to the lane centerline, are calculated, and the frequency distribution of the opposing positions is calculated. At Step S8, this frequency distribution is subjected to calculation of an auto-correlation function with the opposing positions regarded as shift parameters to thereby obtain a lane width of the road.

At Step S9, centerline positions, centerline shapes, and lane widths of a lane are estimated/projected through a follow-up process for following up parameters defining centerline positions, centerline shapes, and lane widths of the lane at the present cycle and future or subsequent cycles with the Kalman filter. Thereafter, Step S1 is again performed and the above steps are repeated.

As explained above, the vehicular lane marker recognition apparatus of the embodiment repeatedly performs follow-up processes for following up parameters defining centerline positions, centerline shapes, and lane widths of a road every cycle to thereby be able to project a position of a lane marker after a predetermined number of cycles. Therefore, even when a road is curved to have a large curvature, data of a characteristic object corresponding to a lane marker can be extracted based on the projected positions. Consequently, a lane marker can be securely recognized regardless of variations in travel or road conditions.

(Modifications)

Figure 12:
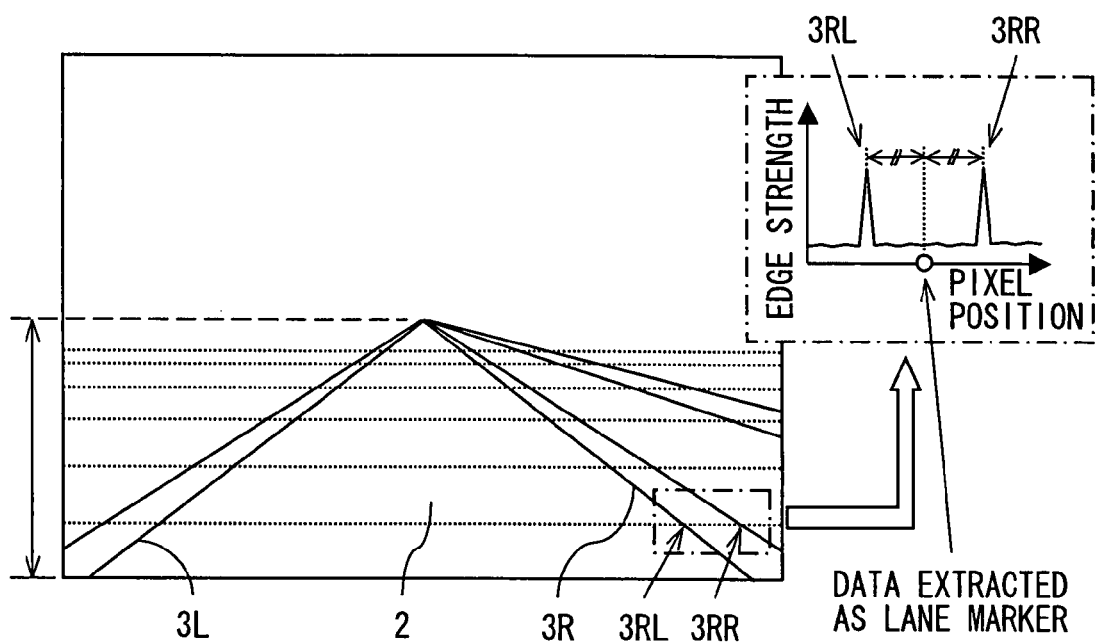
FIG. 12 is a diagram illustrating an image photographing a road surface.

A lane marker is typically painted using a retro-reflective material or the like. An edge strength in an edge portion of a lane marker is intensified in an image photographing road surfaces. FIG. 12 shows an image photographing road surfaces, where a left lane marker 3L and right lane marker 3R of a lane 2 are painted. For instance, edge portions 3RL, 3RR of the lane marker 3R have locally high edge strengths, so pixels positioned in between should be extracted as a lane marker.

To that end, use of measurement values by the lidar instrument 10 may be replaced with another method. A camera may be mounted in the subject vehicle 1 to photograph road surfaces frontward of the vehicle 1. The position of a characteristic object on the road can be measured based on edge strengths calculated from the photographed road surfaces. The measured positions or values P can be then outputted to the signal processor 20 to further computation like that in the above embodiment.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. A lane marker recognition apparatus for recognizing a lane marker on a road frontward or rearward of a vehicle in repeated cycles, the apparatus comprising:
    a characteristic object detection unit detecting a characteristic object on a road;
    a lane marker extraction unit extracting data on a lane marker from data on the detected characteristic object;
    a centerline calculation unit calculating a centerline position and a centerline shape on the road from the extracted data;
    a width calculation unit calculating a lane width of the road from the extracted data; and
    a parameter follow-up unit performing a follow-up process of parameters defining the centerline position, the centerline shape, and the lane width based on the calculated centerline positions, calculated centerline shape, and calculated lane width,
    wherein when the lane marker extraction unit extracts the data on the lane marker at a present cycle, the lane marker extraction unit uses a result from the follow-up process performed at a past cycle by the parameter follow-up unit;
    wherein the width calculation unit includes
        an opposing position calculation unit calculating opposing positions with respect to the centerline in an axle direction of the vehicle in the data extracted by the extraction unit by using a centerline position and a centerline shape estimated at the past cycle or projected for the present cycle in the follow-up process performed by the parameter follow-up unit;
        a frequency calculation unit dividing a coordinate axis indicating the opposing positions into segments, assigns each of the calculated opposing positions into a corresponding segment included in the segments, and calculating frequencies in the individual segments; and
        an auto-correlation function calculation unit performing a calculation of an auto-correlation function with the opposing positions regarded as a shift parameter, with respect to a distribution of the calculated frequencies,
    wherein the width calculation unit calculates a lane width of the road based on a result from the calculation of the auto-correlation function; and
    wherein each of the characteristic object detection unit, the lane marker extraction unit, the centerline calculation unit, the width calculation unit, the parameter follow-up unit, the opposing position calculation, the frequency calculation unit and the auto-correlation function calculation unit includes a hardware unit or a hardware unit and a software program recorded on a non-transitory computer readable memory.

2. The lane marker recognition apparatus of claim 1, further comprising:
    a data storage unit storing data on the detected characteristic object;
    a movement calculation unit calculating a movement amount from travel information of the vehicle; and
    a coordinate conversion unit converting, based on the calculated movement amount, data on a characteristic object, which is detected at the past cycle and stored in the storage unit and is based on past standard coordinates meeting a position of the vehicle at the past cycle, into converted data, which is on present standard coordinates meeting a position of the vehicle at the present cycle, wherein the lane marker extraction unit extracts the data on the lane marker from both (i) the data on the characteristic object detected by the characteristic object detection unit at the present cycle and (ii) the converted data, into which the data on the characteristic object detected by the characteristic object detection unit at the past cycle is converted; and wherein each of the data storage unit, the movement calculation unit and the coordinate conversion unit includes a hardware unit or a hardware unit and a software program recorded on a non-transitory computer readable memory.

3. The lane marker recognition apparatus of claim 1, wherein the lane marker extraction unit includes a lane marker projection unit calculating a projected lane marker position at the present cycle using a centerline position, a centerline shape, and a lane width, which are projected for the present cycle in the follow-up process performed at the past cycle by the parameter follow-up unit, the lane marker projection unit including a hardware unit or a hardware unit and a software program recorded on a non-transitory computer readable storage media, and wherein the extraction unit extracts the data on the characteristic object located within the projected lane marker position calculated by the lane marker projection unit.

4. The lane marker recognition apparatus of claim 1, wherein the centerline calculation unit includes an axle directional component adjustment unit adjusting an axle directional component of the data extracted by the lane maker extraction unit in an axle direction of the vehicle by using a lane width estimated at the past cycle or projected for the present cycle in the follow-up process performed by the parameter follow-up unit to thereby generate data on the centerline of the lane of the road, the axle directional component adjustment unit including a hardware unit or a hardware unit and a software program recorded on a non-transitory computer readable storage media, and wherein the centerline calculation unit calculates a centerline position and a centerline shape of the lane of the road by subjecting the data adjusted by the axle directional component adjustment unit to a Hough's transformation.

5. The lane marker recognition apparatus of claim 4, wherein the centerline calculation unit indicates the centerline position and the centerline shape of the lane of the road by using a curve model, and wherein the centerline calculation unit calculates a parameter to define the curve model by performing the Hough's transformation.

6. The lane marker recognition apparatus of claim 5, wherein the centerline calculation unit designates a focusing range in a parameter space including parameters defining the curve model by using a centerline position and a centerline shape, which are projected for the present cycle in the follow-up process performed by the parameter follow-up unit, in the Hough's transformation, and wherein the centerline calculation unit regards a pair of parameters having a maximum poll, which exceeds a predetermined value, in the focusing range, as the parameters defining the curve model.

7. The lane marker recognition apparatus of claim 1, wherein the width calculation unit designates a focusing range with respect to the shift parameters by using a lane width projected for the present cycle in the follow-up process performed by the parameter follow-up unit, and wherein the width calculation unit regards a shift parameter having a maximum coefficient, which exceeds a predetermined value, in the focusing range, as a lane width of the road.

8. The lane marker recognition apparatus of claim 1, wherein the characteristic object detection unit includes a laser radar sensor configured to perform a measurement of a distance with a characteristic object on the road by receiving a reflection of a laser beam radiated towards the road, and wherein the characteristic object detection unit detects the characteristic object by using a result from the measurement performed by the laser radar sensor.

9. The lane marker recognition apparatus of claim 1, wherein the characteristic object detection unit includes an imaging unit taking an image on the road, and an edge strength calculation unit calculating an edge strength of the taken image, and wherein the characteristic object detection unit detects the characteristic object by using the calculated edge strength; and wherein each of the imaging unit and the edge strength calculation unit includes a hardware unit or a hardware unit and a software program recorded on a non-transitory computer readable memory.

10. A method for recognizing a lane marker on a road frontward or rearward of a vehicle in repeated cycles, the method comprising:

detecting a characteristic object on a road;

extracting data on a lane marker from data on the detected characteristic object;

calculating a centerline position and a centerline shape on the road from the extracted data;

calculating a lane width of the road from the extracted data; and performing a follow-up process of parameters defining the centerline position, the centerline shape, and the lane width based on the calculated centerline positions, calculated centerline shape, and calculated lane width, calculating opposing positions with respect to the centerline in an axle direction of the vehicle in the extracted data by using a centerline position and a centerline shape estimated at the past cycle or projected for the present cycle in the follow-up process, dividing a coordinate axis indicating the opposing positions into segments, assigning each of the calculated opposing positions to a corresponding segment included in the segments, and calculating frequencies in the individual segments, performing a calculation of an auto-correlation function with the opposing positions regarded as a shift parameter, with respect to a distribution of the calculated frequencies, wherein when the data on the lane marker at a present cycle is extracted, a result from the follow-up process performed at a past cycle is used;

wherein the calculating of the lane width of the road calculates a lane width of the road based on a result from the calculation of the auto-correlation function; and wherein each of the detecting step, the extracting step, the calculating the centerline position step, the calculating the lane width step, the performing a follow-up process step, the calculating opposing positions step, the dividing step and the performing the calculation step includes using a hardware unit or a hardware unit and a software program recorded on a non-transitory computer readable memory.

11. A lane marker recognition apparatus for recognizing a lane marker on a road frontward or rearward of a vehicle in serial cycles, the apparatus comprising:

means for detecting a characteristic object on a road;

means for extracting data on a lane marker from data on the detected characteristic object;

means for calculating a centerline position and a centerline shape on the road from the extracted data;

means for calculating a lane width of the road from the extracted data; and means for performing a follow-up process of parameters defining the centerline position, the centerline shape, and the lane width based on the calculated centerline positions, calculated centerline shape, and calculated lane width, wherein when the extracting means extracts the data on the lane marker at a present cycle, the extracting means uses a result from the follow-up process performed at a past cycle by the performing means;

wherein the width calculation unit includes means for calculating opposing positions with respect to the centerline in an axle direction of the vehicle in the data extracted by the extraction unit by using a centerline position and a centerline shape estimated at the past cycle or projected for the present cycle in the follow-up process performed by the parameter follow-up unit, means for dividing a coordinate axis indicating the opposing positions into segments, assigns each of the calculated opposing positions into a corresponding segment included in the segments, and calculating frequencies in the individual segments, and means for performing a calculation of an auto-correlation function with the opposing positions regarded as a shift parameter, with respect to a distribution of the calculated frequencies, wherein the width calculation unit calculates a lane width of the road based on a result from the calculation of the auto-correlation function; and wherein each of the detecting means, the extracting means, the calculating the center position means, the calculating the lane width means, the performing the follow-up process means, the calculating opposing positions means, the dividing means and the performing the calculation means includes a hardware unit or a hardware unit and a software program recorded on a non-transitory computer readable memory.

* * * * *